Figure 1:
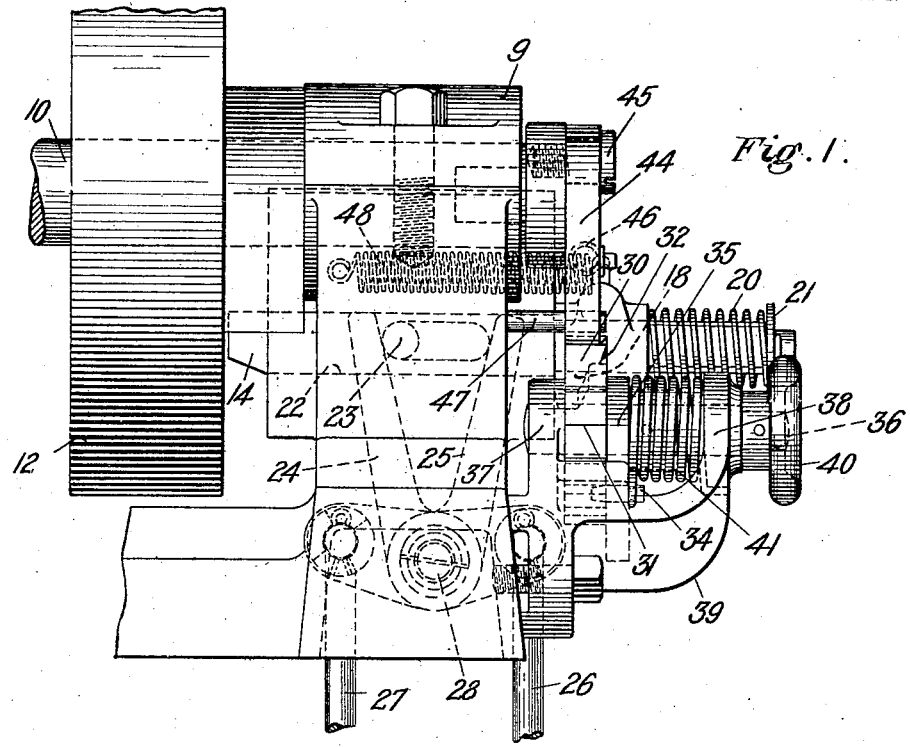

No. 884,051. PATENTED APR. 7, 1908.
S. E. TAFT.
CLUTCH MECHANISM FOR LACING HOOK SETTING MACHINES.
APPLICATION FILED JAN. 8, 1908.

3 SHEETS—SHEET 1.

Witnesses
Inventor
Sydney E. Taft.
by his attorney

No. 884,051.

PATENTED APR. 7, 1908.

S. E. TAFT.
CLUTCH MECHANISM FOR LACING HOOK SETTING MACHINES.
APPLICATION FILED JAN. 8, 1908.

3 SHEETS—SHEET 2.

Witnesses.

Inventor

No. 884,051.
PATENTED APR. 7, 1908.
S. E. TAFT.
CLUTCH MECHANISM FOR LACING HOOK SETTING MACHINES.
APPLICATION FILED JAN. 8, 1908.
3 SHEETS—SHEET 3.
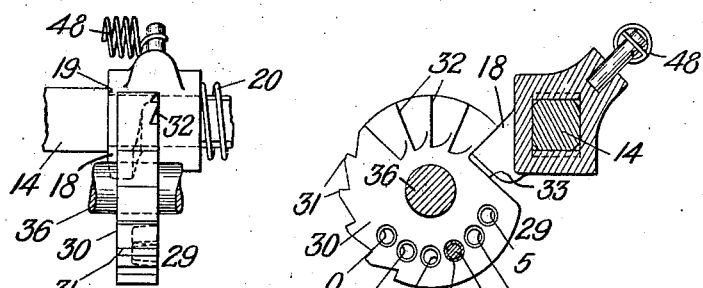
Fig. 6.  Fig. 5.
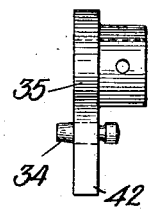 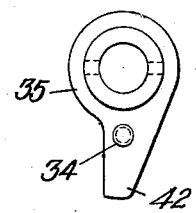
Fig. 8.  Fig. 7.
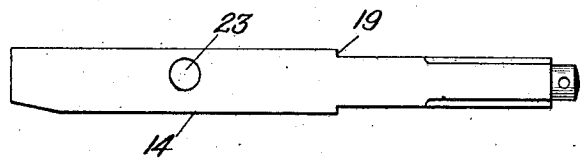
Fig. 9.
Witnesses:  Inventor:

UNITED STATES PATENT OFFICE.

SYDNEY E. TAFT, OF SOUTH FRAMINGHAM, MASSACHUSETTS, ASSIGNOR TO AMERICAN LACING HOOK CO., A CORPORATION OF NEW JERSEY.

CLUTCH MECHANISM FOR LACING-HOOK-SETTING MACHINES.

No. 884,051.   Specification of Letters Patent.   Patented April 7, 1908.

Application filed January 8, 1908. Serial No. 409,760.

*To all whom it may concern:*

Be it known that I, SYDNEY E. TAFT, a citizen of the United States, residing at South Framingham, in the county of Middlesex and State of Massachusetts, have invented new and useful Improvements in Clutch Mechanism for Lacing-Hook-Setting Machines, (Case B,) of which the following is a specification.

This invention relates to a clutch mechanism which is particularly adapted to be used in connection with machines for setting lacing hooks in the uppers of boots and shoes, the object of the invention being to provide a clutch mechanism which can be set so as to drive one, two, three, four, five or more hooks in the upper of a boot or shoe and which is also capable of being operated by the operator at any desired time so that in case a lacing hook becomes jammed or improperly driven the operator can instantly stop the machine, remove the hook from the upper of the boot or shoe and set a new hook in the place of the hook which has been removed and continue the operation to insert the desired number of hooks, say five in number, and then begin a new cycle of operations in which the mechanism will automatically disconnect the clutch from the shaft at the end of any predetermined number of hooks which may be driven in the upper.

The device is also adapted to be set so that the automatic throw-out of the clutch is eliminated and the clutch may be used in the usual manner by the operator setting as many hooks as desired and operating the same by releasing the treadle when the number of hooks desired have been set in the upper.

While I have illustrated and described my improved clutch mechanism as adapted to be particularly used in connection with a lacing hook setting machine, it is evident that the same may be used in connection with other mechanisms in which it is desired to have the main driving shaft make a certain number of rotations and then be automatically disconnected from the driving pulley and also in which said driving shaft is under the control of the operator independent of the automatic clutch operating devices.

In another application filed of even date herewith I have set forth another embodiment of my invention for performing the same functions as the present invention.

The invention consists in the combination and arrangement of parts set forth in the following specification and particularly pointed out in the claims thereof.

Figure 2:
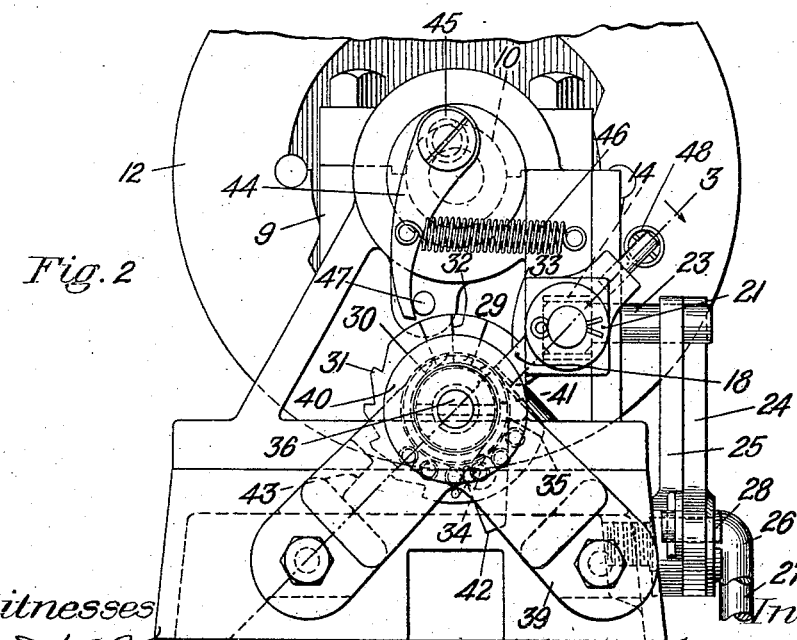
Figure 3:
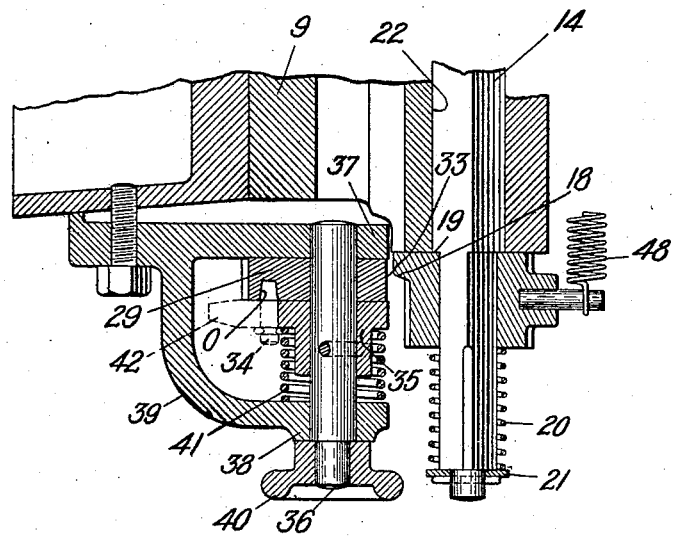
Figure 4:
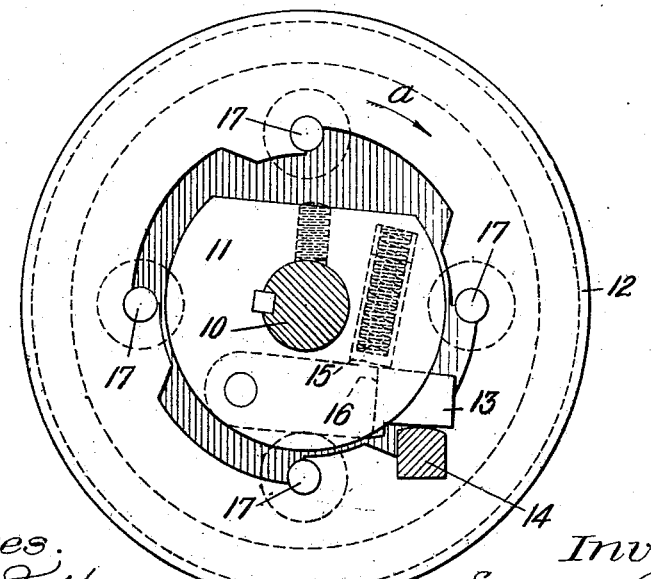

Referring to the drawings: Figure 1 is a front elevation of my improved stop mechanism, the driving shaft being shown broken away. Fig. 2 is a side elevation of the same as viewed from the right of Fig. 1. Fig. 3 is a sectional elevation taken on line 3—3 of Fig. 2. Fig. 4 is a detail elevation of the clutch *per se*, the shaft and tripper slide shown in section. Fig. 5 is a detail elevation of the rotary holder disk with the tripper slide and shaft shown in section. Fig. 6 is an edge view of the same. Fig. 7 is a detail side elevation of the arm which is attached to the rotary holder disk. Fig. 8 is an edge view of the same. Fig. 9 is a detail side elevation of the tripper slide.

Like numerals refer to like parts throughout the several views of the drawings.

In the drawings, 10 is the main driving shaft journaled to rotate in the frame 9.

11 is one clutch member keyed to said shaft.

12 is another member of the clutch consisting of a pulley which is free to rotate upon the shaft. A locking dog or arm 13 is pivoted to the member 11 and when in the position illustrated in Fig. 2, that is, with the tripper slide 14 in engagement therewith, said locking dog allows the clutch pulley to rotate freely without rotating the shaft. When, however, the tripper slide 14 is withdrawn from engagement with the locking dog 13, said locking dog is immediately thrown outwardly at its free end by the spring 15 and is then engaged, at the shoulder 16 thereon, by one of the clutch teeth 17, 17. The two members of the clutch 11 and 12 are then locked together and the rotation of the pulley in the direction of the arrow *a* thereon (Fig. 4) causes the member 11 to be rotated, together with the shaft 10 to which it is fastened, in the direction of said arrow. When the machine is at rest and the operator is placing an upper in position in readiness to have the lacing hooks set therein, the pulley 12 is free to rotate and the tripper slide 14 is in engagement with the locking dog 13, as illustrated in the different figures of the drawings.

The tripper slide 14 has an arm 18 thereon which is held against a shoulder 19 by a spring 20, one end of said spring bearing against said arm, the other against a collar 21 which is fastened to the tripper slide 14. The tripper slide 14, arm 18 and spring 20 with the collar 21 form, as a whole, a tripper device. It will be understood that the tripper slide 14 is arranged to slide in ways 22 formed in the frame 9 and has a pin 23 fast thereto, whereby the slide may be moved by either of the levers 24 or 25, Fig. 1.

The treadle lever 24 is connected by a rod 26 to a suitable treadle (not shown in the drawings) and the treadle lever 25 is connected by a suitable rod 27 to another treadle not shown in the drawings. Both of the right angle levers 24 and 25 are pivoted to a stud 28 fast to the frame 9.

A rotary holder 29 is adapted to hold the tripper out of engagement with the clutch in order to allow the locking dog to spring outwardly and lock the pulley 12 to the member 11. Said rotary holder 29 consists of a disk 30 having teeth 31 upon its periphery and teeth 32 upon one face thereof. Said disk is also provided with a notch or large tooth 33. The disk 30 is provided with a series of holes 0, 1, 2, 3, 4 and 5, each of which is adapted to receive a locking pin 34 fast to an arm 35, the arm 35 being fastened to a stud 36 which is adapted to move longitudinally thereof and to rotate in the arms 37 and 38 of a bracket 39 which is fastened to the frame 9. A knob or handle 40 is fastened to the outer end of the stud 36 and a torsional spring 41 encircles said stud and also the hub upon the arm 35, one end of said spring bearing against the locking pin 34 and the other end thereof being attached to the bracket 39, the tendency of said spring being to hold the free end 42 of the arm 35 against a fixed stop or lug 43 upon the bracket 39 when the tripper slide is withdrawn from engagement with the clutch and to hold the large tooth 33 against the arm 18 when the tripper slide is thrown forward and is in engagement with the clutch or with the locking dog 13 forming a portion of said clutch.

An intermittent rotary movement is imparted to the holder 29 by a pawl 44 which is adapted to engage the teeth 31 and is pivotally supported upon a crank-pin 45 which projects from one end of the shaft 10. A spring 46 holds the pawl 44 either against a guide-pin 47 or in engagement with the teeth 31, as the case may be and as hereinafter described. A spring 48 holds the tripper slide 14 normally in the position illustrated in Fig. 1—that is, in engagement with the locking dog 13, whereby the two members 11 and 12 of the clutch are disengaged from each other and the pulley 12 is free to rotate without rotating the shaft 10.

Having thus specifically described my improved clutch mechanism, I will now proceed to describe the general operation of the same. Assuming the parts to be in the positions illustrated in Figs. 1 and 2, the operator depresses the treadle which is connected by the rod 26 to the lever 24. This will move the pin 23 and the tripper slide 14 to which it is attached toward the right, together with the different portions of the tripper which are supported upon said tripper slide, including the arm 18. Assuming that the stop-pin 34 is projecting into the hole 3, as seen in Fig. 5, it will be understood that as soon as the arm 18 is moved toward the right (Fig. 1) to a sufficient distance to clear the large tooth 33, the spring 41 will cause the holder 29 to rotate until the free end 42 of the arm 35 abuts against the stop 43. Thus the portion of the disk 30 which has the teeth upon its face will pass across the inner end of the arm 18 and thus lock the tripper slide 14 out of engagement with the locking dog. The clutch pulley now rotating and being locked by the locking dog 13 to the other member of said clutch rotates the shaft 10, thus moving the pawl 44 forward until it engages one of the teeth 31 upon the clutch disk and moves said disk forward one tooth at each rotation until the tripper slide is freed and moved toward the left (Fig. 1) by the spring 48 until the forward end of said slide engages the locking dog 13 and throws the clutch out of engagement with the shaft, so that the pulley 12 rotates freely thereon and the machine is stopped.

The pawl in the hereinbefore described operation is guided at its outer end, during a portion of the rotation of the shaft, by the pin 47, so that at each rotation of the shaft the pawl moves through a sufficient distance, while in contact with one of the teeth 31, to move said disk through the space of one of the teeth upon its periphery. The inner end of the arm 18 during this intermittent feeding of the disk, it will be understood is in engagement with the teeth 32 and the number of teeth which the pawl 44 feeds before the arm 18 and the tripper slide to which it is attached are released depends upon the hole in which said pin 34 is inserted. If said pin 34 is inserted in the hole 0, then the free end of the arm 42 will abut against the stop 43, when the large tooth 33 is in the position illustrated in Figs. 2 and 5, so that when the parts are in this position and the tripper slide is thrown backward by the operator, said tripper slide would have to be held out by the operator pressing upon the treadle, as the holder disk 30 would not move across the path of movement of the inner end of the arm 18, and when the locking pin is in the hole 0 this automatic clutch operating mechanism is out of operation at all times. When the locking dog is placed in the hole 1, then the rotary disk will move across the inner end of the arm 18 to the extent of one tooth before the free end 42 of the arm 35 engages the stop 43 and so on up to the full number of holes 2, 3, 4, and 5, which are in the disk 30, so that it will be evident that the device may be used to set one, two, three, four or five lacing hooks or like devices before stopping the rotation of the shaft, as may be desired, and according to the location in which the locking pin 34 is placed relatively to the disk 30.

If, during the hereinbefore described operation, it is desired to stop the machine before the same shall be automatically stopped at the end of its sequence of movements, it may be done by the operator pressing upon the treadle connected by the rod 27 to the treadle lever 25, thus rocking said treadle lever which engages the pin 23 and moves the slide 14 toward the left (Fig. 1) and into engagement with the locking dog 13. It will be understood that the slide 14 can move toward the left (Fig. 1) while the arm 18 remains stationary, said slide being arranged so that it can slide in said arm and when released will be carried back to its original position—(that is, with the shoulder 19 on said slide in contact with the arm 18) by the expansion of the spring 20, so that at any time the operator can stop the machine, as described, by moving the tripper slide 14 across the path of the locking dog 13 and thus disconnecting the members 11 and 12 of the clutch to allow the pulley to rotate freely without rotating the shaft 10.

Having thus described my invention, what I claim and desire by Letters Patent to secure is:

1. In a clutch mechanism, a driving shaft, a member fast to said driving shaft, a member rotatable on said shaft, and means to lock said members together; in combination with a tripper slide adapted to engage said locking means and disconnect said clutch members from each other, means to move said tripper slide out of engagement with said locking means, a rotary holder adapted to hold said tripper slide out of engagement with said locking means, and instrumentalities adapted to rotate said member to release said tripper slide to engage said locking means and disconnect said clutch members at the end of a predetermined number of rotations of said shaft.

2. In a clutch mechanism, a driving shaft, a member fast to said driving shaft, a member rotatable on said shaft, and means to lock said members together; in combination with a tripper slide adapted to engage said locking means and disconnect said clutch members from each other, means to move said tripper slide out of engagement with said locking means, a rotary holder adapted to hold said tripper slide out of engagement with said locking means, instrumentalities adapted to rotate said rotary member to release said tripper slide to engage said locking means and disconnect said clutch members at the end of a predetermined number of rotations of said shaft, and an adjustable stop adapted to limit the rotation of said rotary member relatively to said tripper slide, whereby said predetermined number of rotations may be varied.

3. In a clutch mechanism, a driving shaft, a member fast to said driving shaft, a member rotatable on said shaft, and means to lock said members together; in combination with a tripper slide adapted to engage said locking means and disconnect said clutch members from each other, means to move said tripper slide out of engagement with said locking means, a rotary holder adapted to hold said tripper slide out of engagement with said locking means, instrumentalities adapted to rotate said holder to release said tripper slide to engage said locking means and disconnect said clutch members at the end of a predetermined number of rotations of said shaft, an arm adjustably mounted upon said rotary holder, a stop, and a spring acting to hold said arm against said stop, whereby the rotation of said holder in one direction is regulated.

4. In a clutch mechanism, a driving shaft, a member fast to said driving shaft, a member rotatable on said shaft, and means to lock said members together; in combination with a tripper slide adapted to engage said locking means and disconnect said clutch members from each other, means to move said tripper slide out of engagement with said locking means, a rotary holder adapted to hold said tripper slide out of engagement with said locking means, instrumentalities adapted to rotate said holder to release said tripper slide to engage said locking means and disconnect said clutch members at the end of a predetermined number of rotations of said shaft, and mechanism to impart an intermittent rotary motion to said holder.

5. In a clutch mechanism, a driving shaft, a member fast to said driving shaft, a member rotatable on said shaft, and means to lock said members together; in combination with a tripper slide adapted to engage said locking means and disconnect said clutch members from each other, means to move said tripper slide out of engagement with said locking means, a rotary holder adapted to hold said tripper slide out of engagement with said locking means, teeth on said rotary holder, and a pawl connected to said shaft adapted to engage said teeth and impart an intermittent rotary movement to said holder to release said tripper slide for the purpose specified.

6. In a clutch mechanism, a driving shaft, a member fast to said driving shaft, a member rotatable on said shaft, and means to lock said members together; in combination with a tripper slide adapted to engage said locking means and disconnect said clutch members from each other, means to move said tripper slide out of engagement with said locking means, a rotary holder adapted to hold said tripper slide out of engagement with said locking means, teeth on said rotary holder, a pawl connected to said shaft adapted to engage said teeth and impart an intermittent rotary movement to said holder to release said tripper slide for the purpose specified, teeth on said holder adapted to be engaged by said tripper slide, and a spring acting to hold said tripper slide in engagement with said last named teeth.

7. In a clutch mechanism, a driving shaft, a member fast to said driving shaft, a member rotatable on said shaft, and means to lock said members together; in combination with a tripper, consisting of a slide, an arm movable on said slide, and a spring interposed between said arm and slide and acting to hold said arm against a shoulder on said slide, said slide adapted to engage said locking means and disconnect said clutch members from each other, means to move said slide out of engagement with said locking means, a rotary holder adapted to hold said tripper out of engagement with said locking means, and instrumentalities adapted to rotate said holder to release said tripper and allow said tripper slide to engage said locking means and disconnect said clutch members at the end of a predetermined number of rotations of said shaft.

8. In a clutch mechanism, a driving shaft, a member fast to said driving shaft, a member rotatable on said shaft, and means to lock said members together; in combination with a tripper consisting of a slide, an arm movable on said slide and a spring interposed between said arm and slide and acting to hold said arm against a shoulder on said slide, said slide adapted to engage said locking means and disconnect said clutch members from each other, means to move said slide out of engagement with said locking means, a rotary holder adapted to hold said tripper out of engagement with said locking means, and mechanism adapted to move said slide relatively to said arm to engage said locking means and disconnect said clutch members.

9. In a clutch mechanism, a driving shaft, a member fast to said driving shaft, a member rotatable on said shaft, and means to lock said members together; in combination with a tripper slide adapted to engage said locking means and disconnect said clutch members from each other, means to move said tripper slide out of engagement with said locking means, and a rotary holder adapted to hold said tripper slide out of engagement with said locking means, instrumentalities adapted to rotate said holder to release said tripper slide, said rotary holder consisting of a toothed disk, an arm rotatably and adjustably mounted thereon, and a stop against which said arm is adapted to abut.

10. In a device of the character described, a rotary holder consisting of a disk with teeth on one face thereof and with teeth on its periphery, an arm adjustably mounted on said rotary holder, a stop, a spring acting to move said rotary holder until said arm shall engage said stop, a tripper slide, and an arm yieldingly mounted on said tripper slide adapted to engage the teeth upon the face of said disk, and means adapted to engage the teeth on the periphery of said disk and impart a rotary motion to said disk to move said arm away from said stop.

11. In a device of the character described, a rotary holder consisting of a disk with teeth on one face thereof and with teeth on its periphery, an arm adjustably mounted upon said rotary holder, a stop, a spring acting to move said rotary holder until said arm shall engage said stop, mechanism to impart a rotary motion to said holder to move said arm away from said stop consisting of a shaft and a pawl pivotally connected to said shaft and adapted to engage the teeth upon the periphery of said holder, a tripper slide, and an arm yieldingly mounted on said tripper slide adapted to engage the teeth upon the face of said disk.

12. In a device of the character described, a rotary holder consisting of a disk with teeth on one face thereof and with teeth on its periphery, an arm adjustably mounted upon said rotary holder, a stop, a spring acting to move said rotary holder until said arm shall engage said stop, mechanism to impart a rotary motion to said holder to move said arm away from said stop, consisting of a shaft and a pawl pivotally connected to said shaft and adapted to engage the teeth upon the periphery of said holder, a tripper slide, an arm yieldingly mounted on said tripper slide adapted to engage the teeth upon the face of said disk, a clutch mounted on said shaft, means adapted to lock said clutch to said shaft, and means to move said tripper slide into engagement with said locking means and relatively to said arm while said arm is in engagement with the teeth on the face of said disk.

In testimony whereof I have hereunto set my hand in presence of two subscribing witnesses.

SYDNEY E. TAFT.

Witnesses:
LOUIS A. JONES,
CHARLES S. GOODING.